(12) United States Patent
Kang et al.

(10) Patent No.: US 7,189,023 B2
(45) Date of Patent: Mar. 13, 2007

(54) ROTATIONAL POSITIONING APPARATUS

(75) Inventors: Chan-Jung Kang, Taipei County (TW); Jui-Chi Tseng, Taipei County (TW)

(73) Assignee: Micro-Star Int'l Co., Ltd., Taipei County (TW)

(*) Notice: Subject to any disclaimer, the term of this patent is extended or adjusted under 35 U.S.C. 154(b) by 174 days.

(21) Appl. No.: 10/930,839

(22) Filed: Sep. 1, 2004

(65) Prior Publication Data

US 2006/0044089 A1    Mar. 2, 2006

(51) Int. Cl.
*E05D 3/00* (2006.01)
*F16C 11/00* (2006.01)

(52) U.S. Cl. .......................... 403/119; 16/334; 16/367; 403/112

(58) Field of Classification Search ................ 403/112, 403/113, 117, 119; 361/680–683; 248/917, 248/919–921; 16/337, 340, 342, 367
See application file for complete search history.

(56) References Cited

U.S. PATENT DOCUMENTS

| | | | | |
|---|---|---|---|---|
| 4,408,799 | A * | 10/1983 | Bowman ................ 297/354.12 |
| 6,742,221 | B2 * | 6/2004 | Lu et al. ........................ 16/367 |
| 6,798,646 | B2 * | 9/2004 | Hsu ............................ 361/681 |
| 6,845,546 | B1 * | 1/2005 | Lu et al. ........................ 16/367 |
| 7,013,532 | B2 * | 3/2006 | Lu et al. ........................ 16/337 |
| 2004/0012620 | A1 * | 1/2004 | Buhler et al. ................ 345/716 |
| 2004/0075971 | A1 * | 4/2004 | Tseng et al. ................ 361/681 |
| 2004/0128795 | A1 * | 7/2004 | Lu et al. ........................ 16/342 |
| 2004/0139578 | A1 * | 7/2004 | Yang et al. .................... 16/337 |
| 2004/0151411 | A1 * | 8/2004 | Chang ......................... 384/247 |
| 2005/0251962 | A1 * | 11/2005 | De Mello et al. ............. 16/262 |

FOREIGN PATENT DOCUMENTS

| TW | 551787 | 10/1991 |
|---|---|---|
| TW | 495130 | 7/2002 |

* cited by examiner

*Primary Examiner*—Daniel P. Stodola
*Assistant Examiner*—Joshua T. Kennedy
(74) *Attorney, Agent, or Firm*—Birch, Stewart, Kolasch & Birch, LLP (57) ABSTRACT

A rotational positioning apparatus includes a fixed member having a first wear portion and a stopper portion; at least a positioning washer disposed on the first wear portion, the positioning washer is formed with a positioning portion to abut against the stopper portion and at least a protruding portion radially extending outward; and a rotating member having a second wear portion engaged with the positioning washer, and a push portion for pushing the protruding portion of the positioning washer. With the relative locations for the stopper portion, positioning portion, protruding portion, and pushing portion, a relative rotation track between the fixed member and the positioning washer is summed with a relative rotation track between the rotating member and the positioning washer to flexibly design a rotational angle for the rotational positioning apparatus and ensure that the rotating member is firmly positioned at a desired location.

37 Claims, 9 Drawing Sheets

ROTATIONAL POSITIONING APPARATUS

BACKGROUND OF THE INVENTION

1. Field of the Invention

The present invention relates generally to a rotating apparatus, and in particularly, to a rotational positioning apparatus, which enables rotational positioning in both clockwise and counterclockwise directions.

2. Description of the Related Art

A variety of products are equipped with either a rotational positioning apparatus or rotating mechanism to satisfy different design requirements, modifications, and functionality or ease of operation. Therefore, rotational positioning apparatus or rotating mechanism are widely employed in non-electronic or electronic products such as DVD player, camera, toy, step machine, notebook computer, LCD monitor, PDA, digital video camera, or mobile phone, to provide technical solution directed to various requirements.

For electronic products, such as notebook computer, LCD monitor, PDA, digital video camera, or mobile phone, and the rotational positioning apparatus is usually employed to enable a display to be rotated horizontally with respect to a main body.

Figure 9:
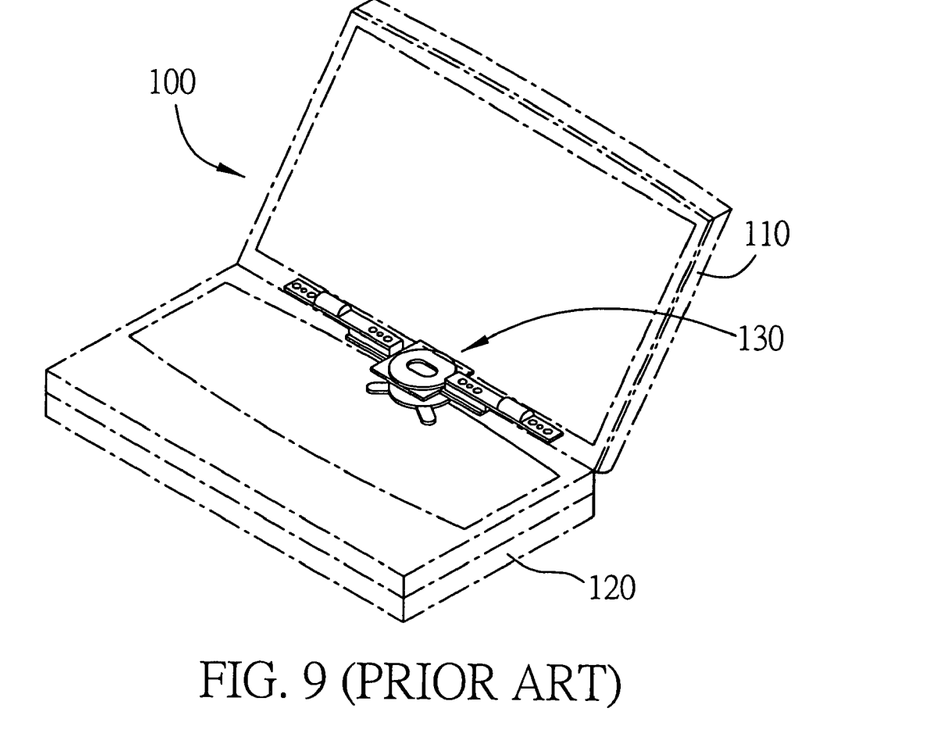
FIGS. 9–11 are schematic views of a conventional rotational positioning apparatus disclosed in TW Publication No. 495130.

Referring to FIG. 9 for TW Publication No. 495130 titled "flat display device and rotating apparatus thereof" with disclosure of a rotating apparatus 130 being connected between a display panel 110 and a main body 120 of a notebook computer, thus the display panel 110 can be rotated with respect to the main body 120.

Figure 10:
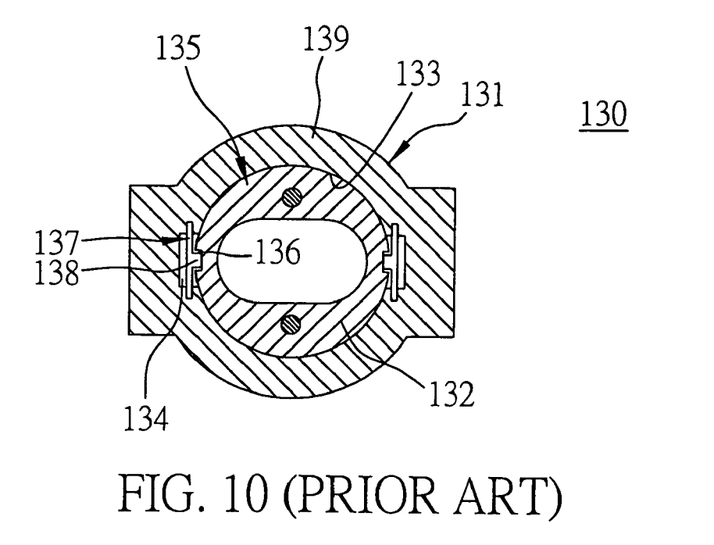

Also referring to FIG. 10, the rotating apparatus 130 is secured on the main body 120 (with reference to FIG. 9) via a fixed member 131, and attached to the display panel 110 via a rotating member 132. The fixed member 131 comprises a tube portion 139 having a through hole 133 defined therein, and two accommodating slots 134 are further defined longitudinally at two opposite ends on an inner wall of the through hole 133. The rotating member 132 comprises a cylinder portion 135 accommodated in the through hole 133 of the fixed member 131. Two locking slots 136 are defined axially at two opposite ends of an outer surface of the cylinder portion 135. Elastic members 137 are respectively engaged to the accommodating slots 134, wherein each of the elastic members 137 comprises an elongated extrusion 138. Thus, the display panel 110 is positioned by engaging the extrusions 138 to the locking slots 136 after the display panel 110 is rotated.

Figure 11:
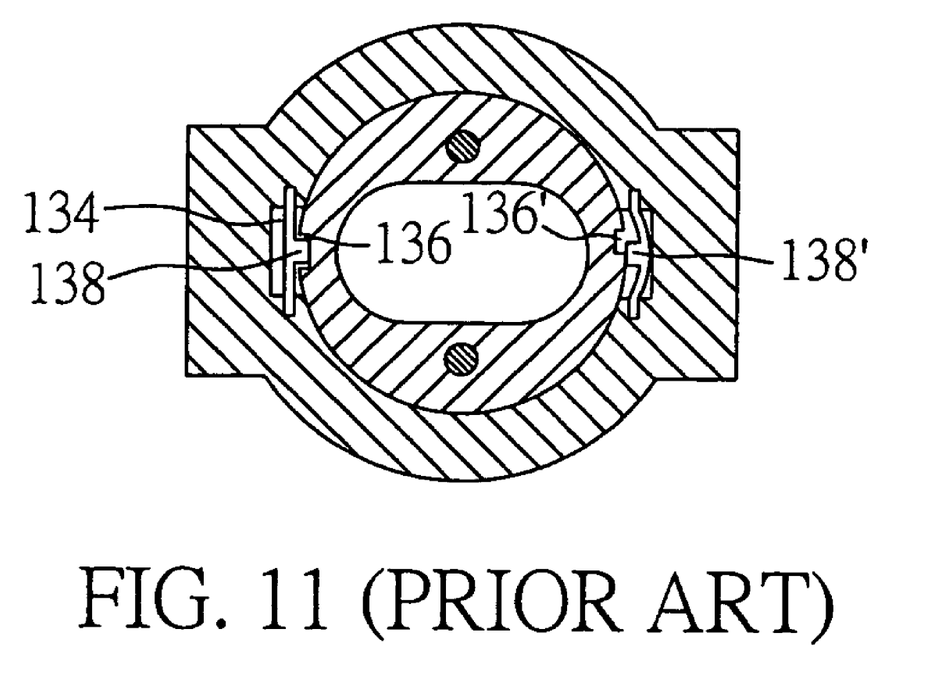

However, since the extrusions 138 and locking slots 136 are positioned by ragged-engagement, the extrusions 138 are usually not tightly engaged to the locking slots 136 due to error tolerance for manufacturing both, resulting the display panel to wobble in horizontal or vertical directions without stable position. Simultaneously, corresponding locations for the accommodating slots 134, extrusions 138 and locking slots 136 have to be precisely calculated if the extrusions 138 are to be inserted into the locking slots 136. In case of any one of the above three locations deviates, one extrusion 138 would be engaged in corresponding locking slot 136 while the other extrusion 138' would be located outside the corresponding locking slot 136', resulting inaccurate positioning as illustrated in FIG. 11.

Figure 12:
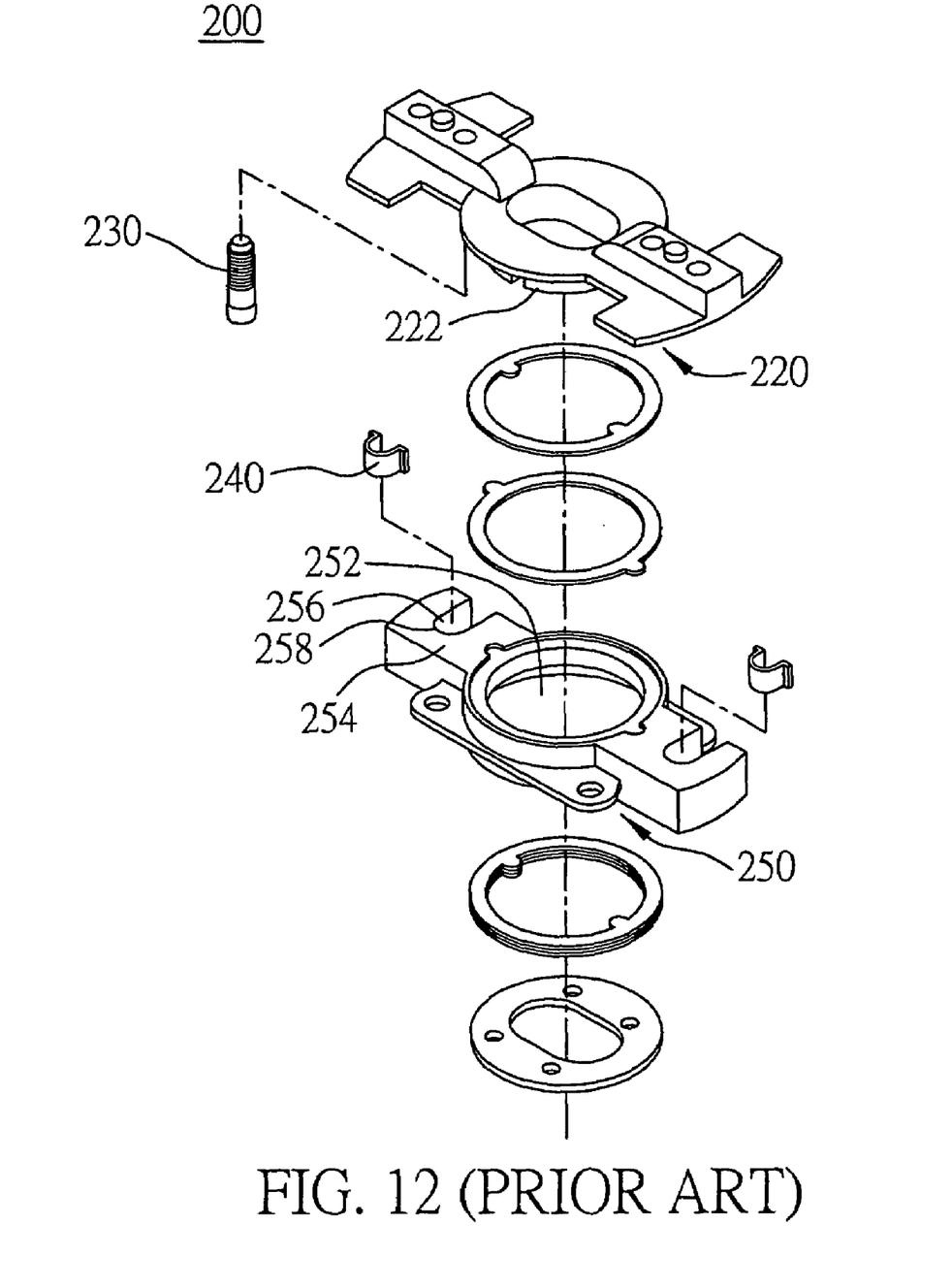
FIG. 12 is a schematic view of a conventional rotational positioning apparatus disclosed in TW Publication No. 551787.

Referring to FIG. 12 for TW Publication No. 551787 titled "electronic product incorporating rotating and positioning apparatus" with disclosure of another type of rotational positioning apparatus 200. The rotational positioning apparatus 200 comprises a rotating member 200, a positioning member 230, two elastic members 240, a fixed member 250 and a plurality of washers. A cylinder portion 222 is extended from a surface of the rotating member 220. The positioning member 230 is downwardly mounted on one side of the rotating member 220. A through hole is defined in a central portion of the fixed member 250 to accommodate the cylinder portion 222 of the rotating member 220, such that the rotating member 220 can rotate about the fixed member 250. The fixed member 250 has two shoulder portions 254 extending outwards from two opposite ends thereof, wherein each of the shoulder portion 254 is defined with a cutout 256 having an accommodating slot 258 at rear end thereof for accommodating the corresponding elastic member 240 therein. After the positioning member 230 is mounted on the rotating member 220, and the cylinder portion 222 of the rotating member 220 is engaged to the through hole 252 of the fixed member 250, the rotating member 220 can rotate about the fixed member 250, so as to stably position the rotating member 220 by locking the positioning members 230 into the elastic members 240 mounted at both ends of the fixed member 250.

However, the rotating member 220 of the above rotational positioning apparatus 200 can only rotate 180 degrees about the fixed member 250 at most, and the rotation at 180 degrees can only be made in one direction. Consequently, the rotating member 220 would fail in case of the rotating member 220 is required to rotate about the fixed member 250 beyond 180 degrees, or the rotating member 220 is required to rotate about the fixed member 250 in both clockwise and counterclockwise directions, dramatically limiting its application.

Also, according to the above rotational positioning apparatus, the slot is adopted as a position limiting apparatus and a positioning mechanism is implemented as a result of the positioning member interfering with the elastic member or spring with ball bearings. Furthermore, the rotating member and fixed member are usually made of zinc alloy which is soft and easily worn out. Thus, the components of the above rotational positioning apparatus are substantially worn out when they are subjected to friction at high frequency, leading to poor positioning mechanism.

As is understood above, the conventional rotational positioning apparatus are associated with many drawbacks such as one-direction-only rotation, limited rotation angle and poor positioning effect. In light of the problems above, it is an objective for the manufacturers to provide a rotational positioning apparatus capable of being rotated in both clockwise and counterclockwise directions, having flexible rotational angle, and being firmly positioned.

SUMMARY OF THE INVENTION

An objective of the present invention is to provide a rotational positioning apparatus which can freely rotate in clockwise and counter clockwise direction.

Another objective of the present invention is to provide a rotational positioning apparatus which is designed flexibly with rotational angle.

Still another objective of the present invention is to provide a rotational positioning apparatus which can be firmly positioned.

In accordance with the above and other objectives, the present invention proposes a rotational positioning apparatus. The rotational positioning apparatus comprises a fixed member having a first wear portion and a stopper portion; at least a positioning washer disposed on a top end of the first wear portion, the positioning washer is formed with a positioning portion abutting against the stopper portion and at least a protruding portion extending axially outwards therefrom; and a rotating member having a second wear portion engaged with the positioning washer and a push portion for pushing the protruding portion, so that the positioning portion of the positioning washer is driven to initiate rotation of the positioning washer, and the positioning portion is stopped by the stopper portion to enable positioning during the rotation. The stopper portion of the fixed member is an arc-shaped convex or concave structure.

In one preferred embodiment of the present invention, a plurality of positioning washers may be added between the fixed member and the rotating member to increase the range of rotational angles for the rotating member. In another preferred embodiment of the present invention, the fixed member and the first wear portion are integrally formed, and the rotating member and the second wear portion are integrally formed. In still another preferred embodiment, the fixed member and the first wear portion, the rotating member and the second wear portion may be formed individually and may be engaged to each other.

In the present invention, the positioning washer may serve as the freely rotatable member, such as spring plate to control the range of rotational angles for the rotating member, so as to provide the rotational positioning apparatus that can rotate in both clockwise and counterclockwise directions. The problems and limitations associated with the conventional rotational positioning apparatus capable of rotating only in one direction are resolved.

In addition, with the corresponding locations of the stopper portion of the fixed member, the positioning portion and protruding portion of the positioning washer, a relative rotation track between the fixed member and the positioning washer may be summed with a relative rotational track between the rotating member and the positioning washer to flexibly design not only the rotation angle range of the rotational positioning apparatus, but also allows the freely rotating positioning washer to be securely positioned at desired location, so as to resolve problems such as angle limitation, rotational positioning wear, and poor positioning associated with the conventional rotational positioning apparatus. The present invention overcomes many drawbacks from the conventional rotational positioning apparatus to provide a wider application for the rotational positioning apparatus.

Further scope of the applicability of the present invention will become apparent from the detailed description given hereinafter. However, it should be understood that the detailed description and specific examples, while indicating preferred embodiments of the invention, are given by way of illustration only, since various changes modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

In particularly, reference numerals designated to the same elements in various embodiments are kept the same in the rotational positioning apparatus illustrated for simplification purpose.

First Preferred Embodiment

Figure 1:
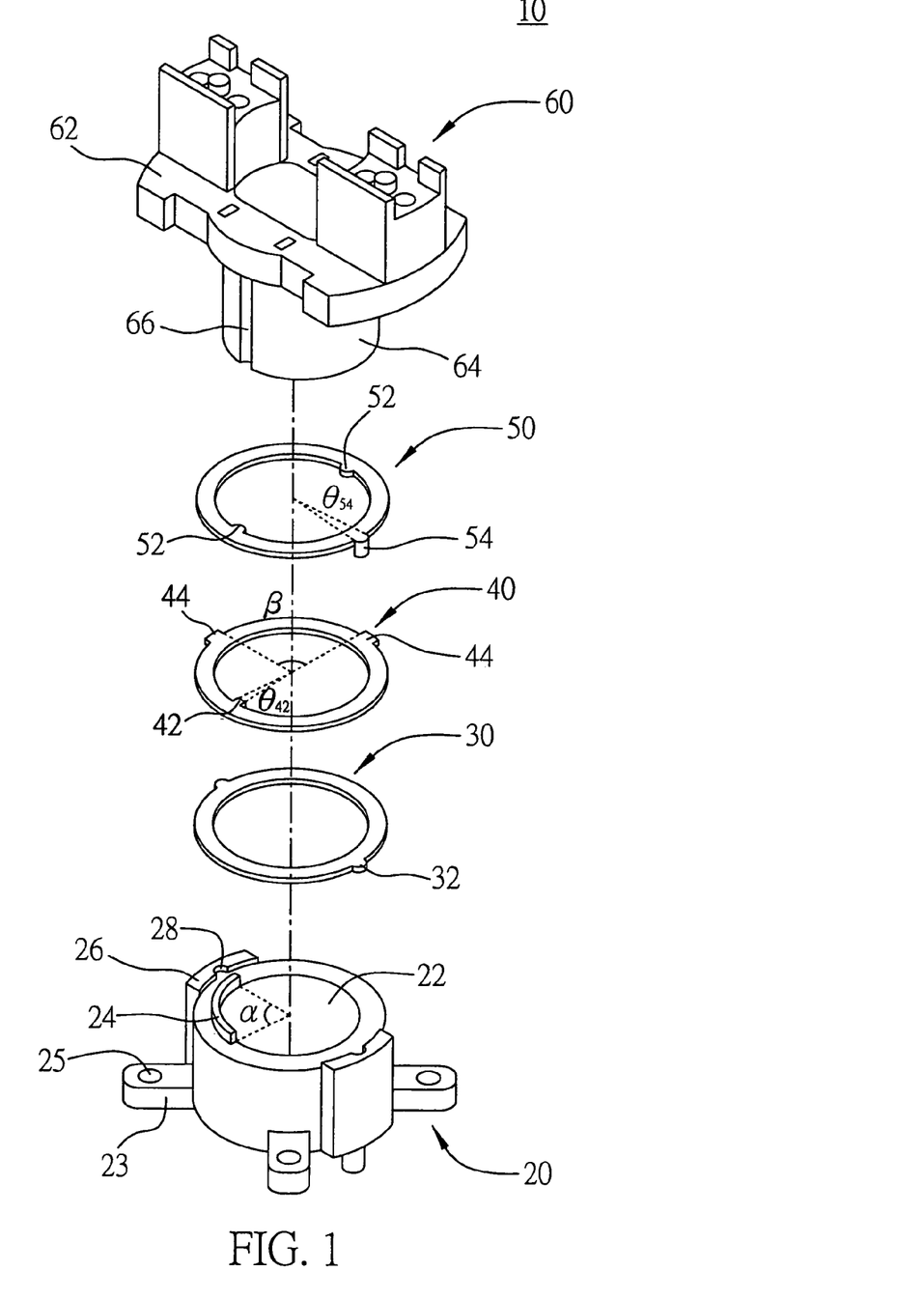
FIG. 1 is an exploded view of a rotational positioning apparatus in accordance with a first preferred embodiment of the present invention.

Referring to FIG. 1, a rotational positioning apparatus 10 in accordance with the first embodiment of the present invention is illustrated. The rotational positioning apparatus 10 comprises: a hollow fixed member 20; a first washer 30 disposed on the fixed member 20; a second washer 40 disposed on the first washer 30; a third washer 50 disposed on the second washer 40; and a rotating member 60 mounted and freely rotated on the fixed member 20 to extend through said first washer 30, second washer 40, and third washer 50 protruding portion.

It is to be understood that, the rotational positioning apparatus 10 can be widely used in various electronic or non-electronic products which require rotational positioning mechanism. The rotational positioning apparatus 10 can be used in, but not limited to notebook computer, LCD monitor, PDA, digital video camera, or mobile phone. The fixed member 20 having two ends, with one end engaged with a fixed portion or part of the product, and the other end engaged to the rotating member 60, while one end of the rotating member 60 away from fixed member 20 is engaged to rotating portion or part of the product (not shown). Therefore, the rotating portion of the product can freely rotate relative to the fixed portion or part via the engagement of the fixed member 20 and the rotating member 60.

The fixed member 20 is generally hollow and tube shaped having a through hole 22 defined at a hollow potion thereof. A top end of the fixed member 20 extends upwards along a periphery of the through hole 22 for a predetermined distance to form an arc-shaped stopper portion 24. The arc length and position of the stopper portion 24 may be different according to various embodiments. In present embodiment, an angle between two lateral sides of the stopper portion 27 and a center of the through hole 22 is illustrated as $\alpha$. The angle $\alpha$ is preferably smaller than 180 degrees. However, the angle $\alpha$ may also be equal to or greater than 180 degrees. It should be noted that the stopper portion is preferably a convex arc-shaped structure in the present embodiment. Yet, the stopper portion 24 may also be an arc-shaped groove or other equivalent track-limiting structures, but not limited to the scope of the present embodiment.

A pair of shoulder portions 26 is extended outward from two opposite sides of an outer circumferential surface of the fixed member 20, and each of the shoulder portions 26 having a top end higher than the top end of the fixed member 20 for an appropriate distance. An ear concave portion 28 is formed at middle portion of each of the shoulder portion 26, such that a bottom end of the ear concave portion 28 is flush with the top end of the fixed member 20. A plurality of connecting portions 23 is extended radially outward from a lower portion of the fixed member 20, and each connecting portion 23 is defined with a locking hole 25 for secure the fixed member 20 to the fixed portion of said product.

The first washer 30 is disposed on the top end of the fixed member 20. Thickness of the first washer 30 is approximately equal to the distance for which the top end of the shoulder portion 26 is higher than the top end of the fixed member 20. A pair of first ear protrusions 32 is extended from opposite sides of an outer circumferential surface of the first washer 30 respectively, for corresponding to the ear concave portions 28 of the shoulder portion 26 of the fixed member 20. And the top and bottom ends of each of the first ear protrusions 32 are respective flush with the top and bottom ends of the first washer 30.

The second washer 40 is disposed on the top end of the first washer 30 to serve as a positioning washer. A positioning portion 42 is extended downward from appropriate position along an inner circumferential surface of the second washer 40. An angle between two lateral sides of the positioning portion 42 and the center of the second washer 40 is illustrated as $\theta_{42}$. The positioning portion 42 can abut against two lateral edges of the stopper portion 24 of the fixed member 20 respectively to achieve positioning. Two protruding portions 44 are formed and spaced apart from each other at appropriate locations on an outer circumferential surface of the second washer 40. And the top and bottom ends of each of the protruding portions 44 are flush with top and bottom ends of the second washer 40. The arc distance between the protruding portions 44 and their locations may be different according to various embodiments. In the present embodiment, an angle between the protruding portions 44 and the center of the second washer 40 is illustrated as $\beta$. The angle $\beta$ is preferably smaller than 180 degrees. However, the angle $\beta$ may also be equal to or greater that 180 degrees.

The third washer 50 is disposed on the top end of the second washer 30. A pair of locking ears 52 is extended inward from opposite ends of an inner circumferential surface of the third washer 50. And the top and bottom ends of each of the locking ears 52 are flush with the top and bottom ends of the third washer 50, respectively. A second ear protrusion 54 is extended downward and outward from appropriate position on an outer circumferential surface of the third washer 50 to serve as a pushing portion which pushes the protruding portions 44. An angle between two lateral edges of the second ear protrusion 54 and the center of the third washer 50 is illustrated as $\theta_{54}$. The top end of the second ear protrusion 54 is flush with the top end of the third washer 50, the bottom end of the second eat protrusion 54 extends beyond bottom end of the third washer 50 for an appropriate distance, wherein said appropriate distance is preferably equal to the thickness of the second washer 40. The two lateral edges of the second ear protrusion 54 can respectively abut against lateral edges of the protruding portions 44 of the second washer 40. Thus, the second washer 40 is driven to rotate by the second ear protrusion 54 that pushes the corresponding protruding portions 44 to move when the rotating member 60 is rotated. Consequently, regardless of whether the second ear protrusion 54 of the third washer 50 is rotated in clockwise or counterclockwise direction from an initial position where the second ear protrusions 54 match the two protruding portions 44 protruding portion, the third washer 50 may be pre-rotated at an angle of $(\beta-\theta_{54})/2$ degrees before the second ear protrusions 54 abut against any one of the protruding portions 44 to drive rotation of the second ring 40. In a further embodiment of the present invention, when two or more of the second ear protrusion 54 are adopted, said two second ear protrusions 54 may be disposed respectively at two opposite ends on the outer circumferential surface of the third washer 50, for stably driving the rotation of the second washer 40, and preventing wobbling of the second washer 40 to affect overall function. In addition, although the second ear protrusion 54 is exemplified to be outwardly and downwardly extended from the outer circumferential surface of the third washer 50 for serving as a pushing portion that pushes the protruding portions 44. But, it should be noted that the second ear protrusion 54 may be other equivalent structures, such as pushing structure with slant extension or pushing structure having a hooked end, as long as the pushing structure can push the protruding portions 44 to move. The second ear protrusion 54 is not limited only to the configurations discussed in the present or other embodiments of the present invention.

The rotating member 60 comprises a base portion 62 having a top end attached to the rotating portion or part of said product. The base portion 62 has a bottom end extending downward from an approximately central portion thereof for a predetermined distance to form a cylindrical receiving portion 64. The receiving portion 64 may be a hollow cylinder having a pair of radial locking slots 66 defined at opposite ends of an outer circumferential surface of the insertion portion 64 to correspond to the locking ears 52 of the third washer 50, so that the locking ears 52 can engage to the locking slots 66. The hollow portion of the receiving portion 64 is further connected to a drive source (not shown), such as a motor to drive the rotation of the rotating member 60, wherein the drive source is not limited to be fixed adjacent to the fixed member 20 or the base portion 62. Since the drive source that drives the rotation of the rotating member 60 and the working theory involved are well known to those skilled in the art, the details thereof are omitted herein.

In the course of assembling the rotational positioning apparatus 10, the bottom end of the first washer 30 is firstly attached to the top end of the fixed member 20. Simultaneously, the first ear protrusions 32 of the first washer 30 are respectively engaged to corresponding ear concaves portions 28 of the shoulder portion 26 of the fixed member 20, and the inner circumferential surface of the first washer 30 abuts the outer circumferential surface of the stopper portion 24 of the fixed member 20, so as to secure the first washer 30 to the fixed member 20.

Figure 2:
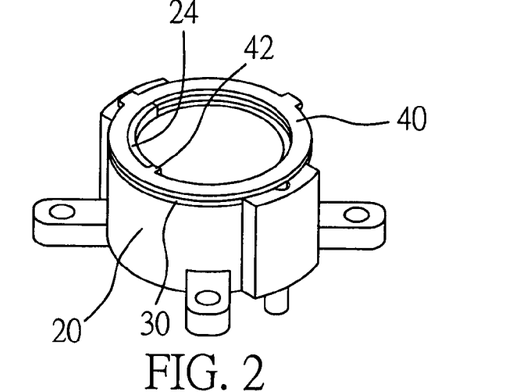
FIGS. 2 and 3 are schematic views illustrating an assembling process of the rotational positioning apparatus in accordance with the first preferred embodiment of the present invention.

Secondly, the bottom end of the second washer 40 is attached to the top end of the first washer 30 such that the inner circumferential surface of the second washer 40 abuts the outer circumferential surface of the stopper portion 24 of the fixed member 20. Thus, the second washer 40 can be rotated axially about the fixed member 20, until the positioning portion 42 abuts against any lateral edge of the stopper portion 24 of the fixed portion 20 where the positioning portion 42 is stopperped and positioned. FIG. 2 illustrates the second washer 40 being assembled on the first washer 30. Consequently, regardless of whether the positioning portion 42 is rotated in clockwise or counter clockwise direction from an initial position symmetrical at the two lateral sides of the stopper portion 24, the rotation can be made at most at an angle of $(360-(\alpha+\theta_{42}))/2=(180-(\alpha+\theta_{42})/2)$ degrees in both directions at the same time.

Figure 3:
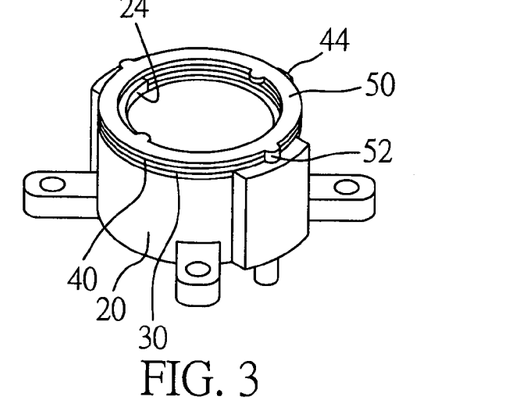

Thirdly, the bottom end of the third washer 50 is attached to the top end of the second washer 40 such that the inner circumferential surface of the third washer 50 abuts the outer circumferential surface of the stopper portion 24. Meanwhile, the second ear protrusion 54 is arranged within the $\beta$ angle between the two protruding portions 44 of the second washer 40. Thus, the third washer 50 can be rotated axially about the fixed member 20, wherein the second ear protrusion 54 abuts against and pushes corresponding protruding portions 44 to move, until the positioning portion 42 of the second washer 40 abuts against any lateral edge of the stopper portion 24 of the fixed portion 20 where the positioning portion 42 is stopperped and positioned. FIG. 3 illustrates the third washer 50 being assembled on the second washer 40. As stated above, the third washer 50 is pre-rotated clockwise or counterclockwise by an angle of $(\beta-\theta_{54})/2$ degrees, before the second ear protrusion 54 of the third washer 50 abuts against corresponding protruding portions 44 of the second washer 40. Therefore, the third washer 50 can be rotated clockwise or counterclockwise by an angle of $(\beta-\theta_{54})/2+(180-(\alpha+\theta_{42})/2)$ degrees. In case of $\beta=(90+\theta_{54})$ degrees, and $\alpha=(90-\theta_{42})$ degrees, the third washer 50 may be rotated 180 degrees in both clockwise and counterclockwise directions, or 360 degrees in either clockwise or counterclockwise direction.

Figure 4:
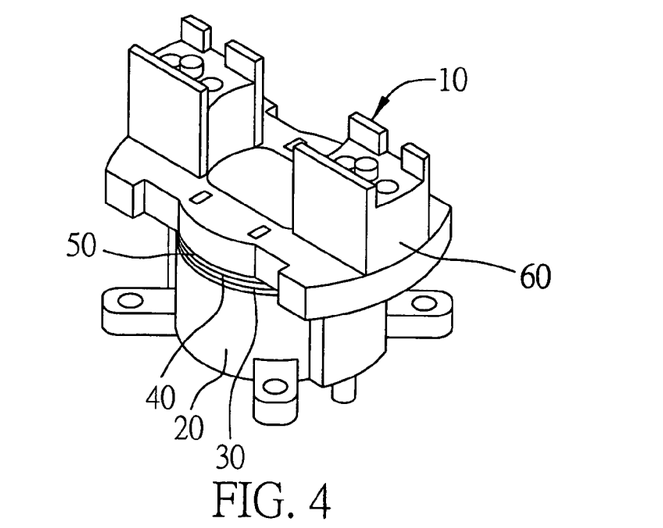
FIG. 4 is a 3-dimensional view of an assembly of the rotational positioning apparatus in accordance with the first preferred embodiment of the present invention.

Lastly, the receiving portion 64 of the rotating member 60 penetrates through the third washer 50, second washer 40, and first washer 30 to be engaged in the through hole 22 of the fixed member 20. Simultaneously, the locking ears 52 of the third washer 50 respectively engage to corresponding locking slots 66 of the receiving portion 64, so that the rotation of the rotating member 60 can drive the third washer 50 to rotate. Since the rotational angle of the rotating member 60 is the same as that of the third washer 50, the rotating member 60 can be rotated 180 degrees in both clockwise and counterclockwise directions, or 360 degrees in either clockwise or counterclockwise direction. FIG. 4 illustrates the assembled view of the rotational positioning apparatus 10.

It can be understood that, within the scope of the present invention, those skilled in the art may change or modify the above assembly procedure; for example, the assembly sequence may be altered, or the length of the stopper portion 24 of the fixed member 20, the positions of the positioning portion 42 and the protruding portions 44 of the second washer 40, the numbers of the second ear protrusion 54, and the sizes of the angle $\alpha$ and $\beta$ may be altered. In further assembly procedure, an additional washer (not shown) can be attached to the bottom end of the fixed member 20, followed by axially locking the rotating member 60 to the fixed member 20 via conventional fastening method including screw means. Since screw means is conventional technique well known to those skilled in the art, the details thereof are omitted herein.

Since the assembly sequence, the length of the stopper portion 24 of the fixed member 20, the positions of the positioning portion 42 and the protruding portions 44 of the second washer 40, the numbers of the second ear protrusion 54, and the sizes of the angle $\alpha$ and $\beta$ may be altered according to the design requirement, a range of rotational angles for the rotating member 60 may be achieved to control the rotation range of the rotating member 60. Consequently, the rotational positioning apparatus of the present invention can be designed flexibly with desired rotational angle and more widely used in variety of applications.

Summarizing from the rotational positioning apparatus 10 described above, it is understood that the first washer 30 serves as a first wear member to prevent the fixed member 20 from wearing out, and the stopper portion 24 of the fixed member 20 serves as a limiting structure that limits the rotation track of the second washer 40. The third washer 50 serves as a second wear member to prevent the rotating member 60 from wearing out, and the second ear protrusion 54 serves as a push member which pushes the protruding portions 44, so that the protruding portions 44 are pushed by the second ear protrusion 54 to drive the rotation of the second washer 40. The first washer 30 and the third washer 50 respectively serve as buffer rings. The first washer 30 and third washer 50 may be made of hard metal or metal alloy, or other appropriate material, so as to prevent the fixed member 20 and the rotating member 60 from wearing out each other during the rotational positioning. As the fixed member 20 and the rotating member 60 can be prevented from being worn out, cost and time for replacing those worn out fixed member 20 and rotating member 60 can also be saved besides improving rotational positioning effect.

Second Preferred Embodiment

Figure 5:
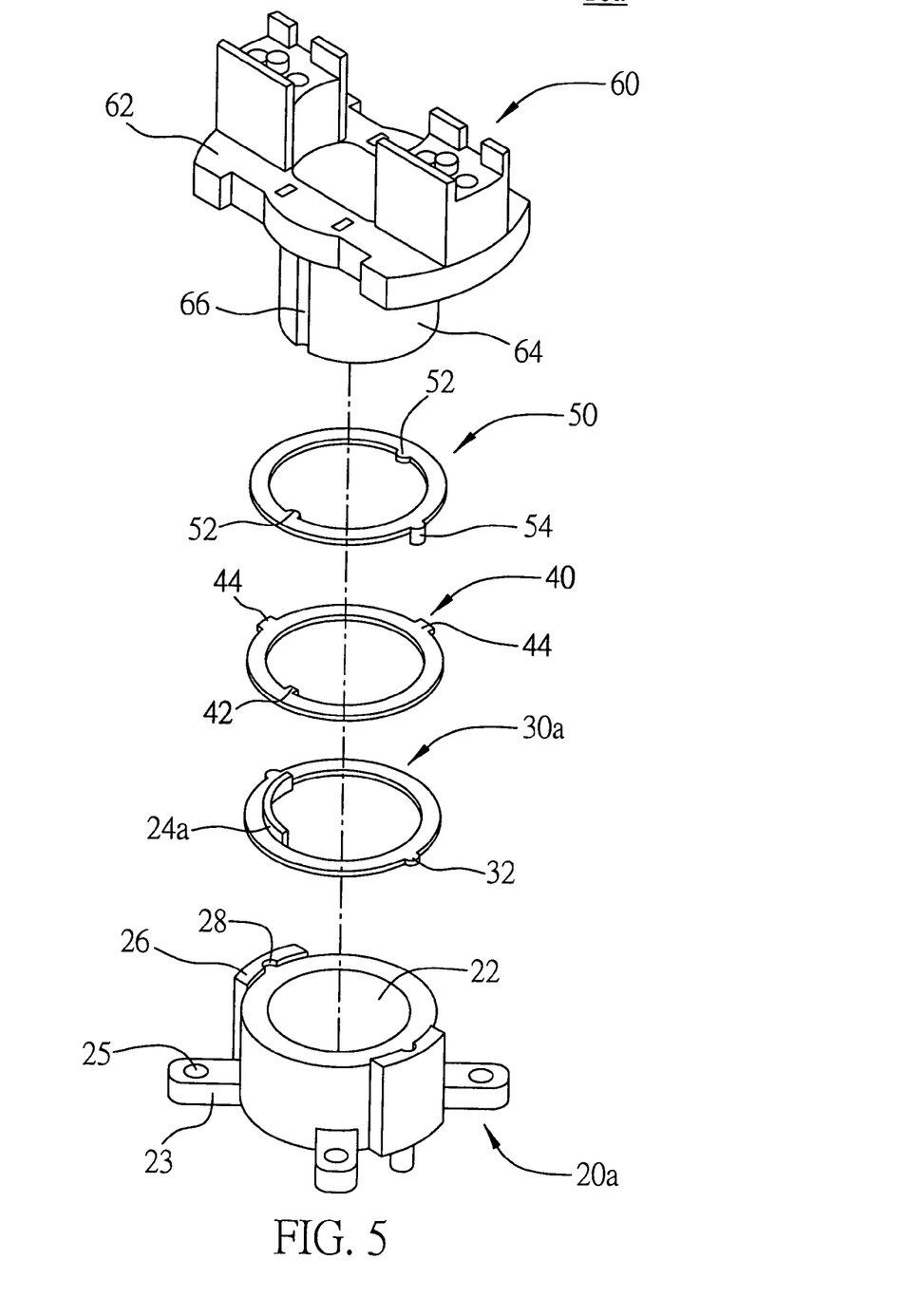
FIG. 5 is an exploded view of the rotational positioning apparatus in accordance with a second preferred embodiment of the present invention.

Referring to FIG. 5, a rotational positioning apparatus 10a of the present embodiment is similar to the rotational positioning apparatus 10 of the first preferred embodiment. The rotational positioning apparatus 10a comprises: a hollow fixed member 20a; a first washer 30a disposed on the fixed member 20a; a second washer 40 disposed on the first washer 30a; a third washer 50 disposed on the second washer 40; and a rotating member 60 penetrating through said first washer 30a, second washer 40, and third washer 50 to be engaged by rotation with the fixed member 20a.

The present embodiment differs from the first preferred embodiment in that the top end of the fixed member 20a is not formed with the arc-shaped stopper portion 24 as disclosed in the first preferred embodiment. Instead, an arc-shaped stopper portion 24a is extended outward and upward from appropriate position along the inner circumferential surface of the first washer 30. The positioning portion 42 of the second washer 40 abuts against lateral edges of the stopper portion 24a of the first washer 30a to position the second washer 40.

The assembly procedure and rotational movement of the rotational positioning apparatus 10a are approximately the same as those of the first preferred embodiment, so they are not further described herein.

Third Preferred Embodiment

Figure 6:
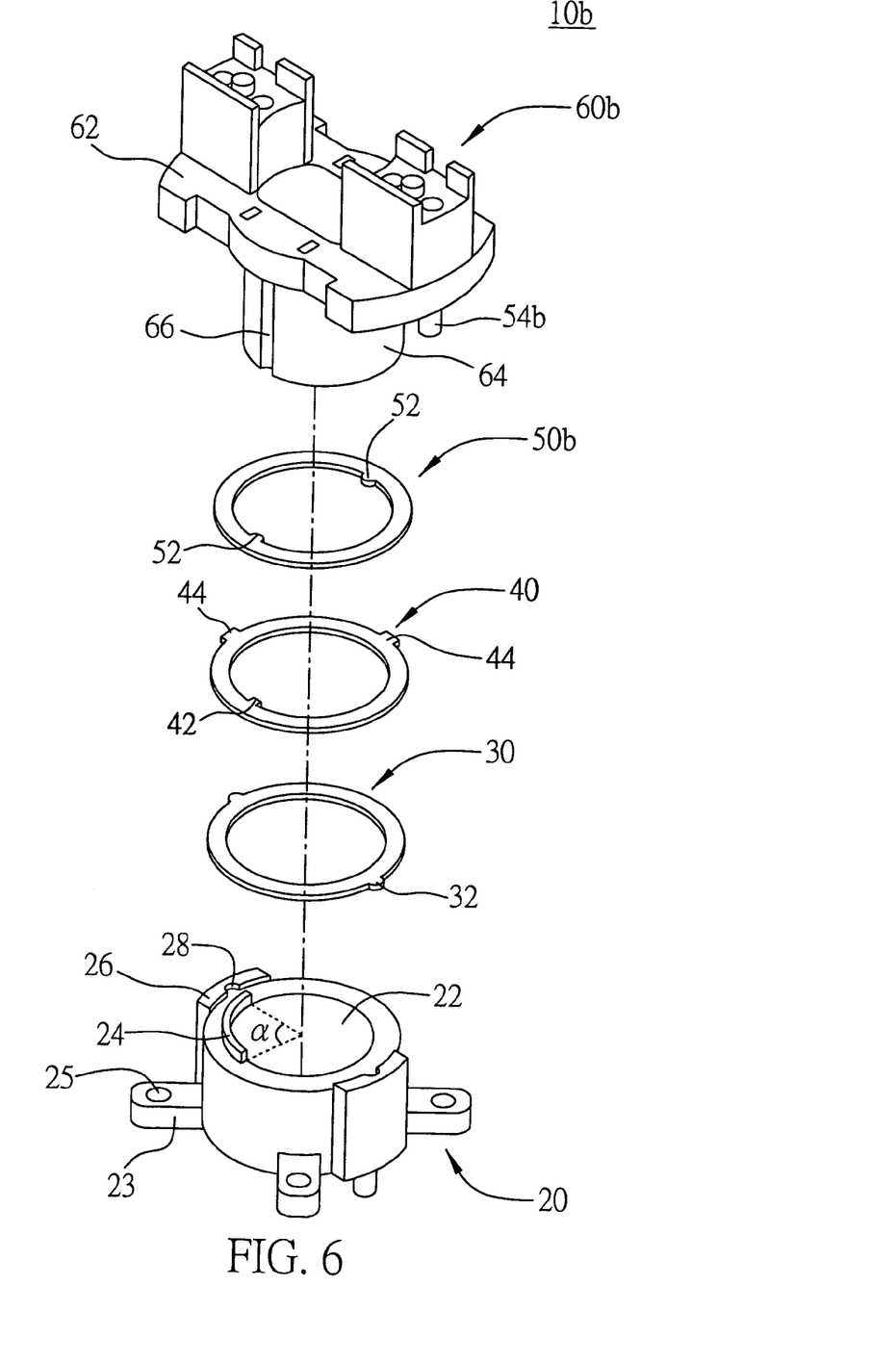
FIG. 6 is an exploded view of the rotational positioning apparatus in accordance with a third preferred embodiment of the present invention.

Referring to FIG. 6, a rotational positioning apparatus 10b of the present embodiment is also similar to the rotational positioning apparatus 10 of the first preferred embodiment. The rotational positioning apparatus 10b comprises: a hollow fixed member 20; a first washer 30 disposed on the fixed member 20a; a second washer 40 disposed on the first washer 30; a third washer 50b disposed on the second washer 40; and a rotating member 60b penetrating through said first washer 30, second washer 40, and third washer 50b to be engaged by rotation with the fixed member 20.

The present embodiment differs from the first preferred embodiment in that the third washer 50b is not formed with the second ear protrusion 54 of the third washer 50 as disclosed in the first preferred embodiment. Instead, a post 54b extends downward from appropriate position of the base portion 62 of the rotating member 60b. The post 54b abuts against and pushes the protruding portions 44 of the second washer 40 to rotate when the rotating member 60b is rotated. Although the post 54b serves as a push portion that extends downward from the rotating member 60b, the post 54b may also be other equivalent protruding structures which abut against the lateral edges of the protruding portions 44 and not limited as such. Meanwhile, the post 54b may also serve as the protruding structure that extends downward from the third washer to push the protruding portions 44.

The assembly procedure and rotation movement of the rotational positioning apparatus 10b are approximately the same as those of the first preferred embodiment, so they are not further described herein.

Fourth Preferred Embodiment

Figure 7:
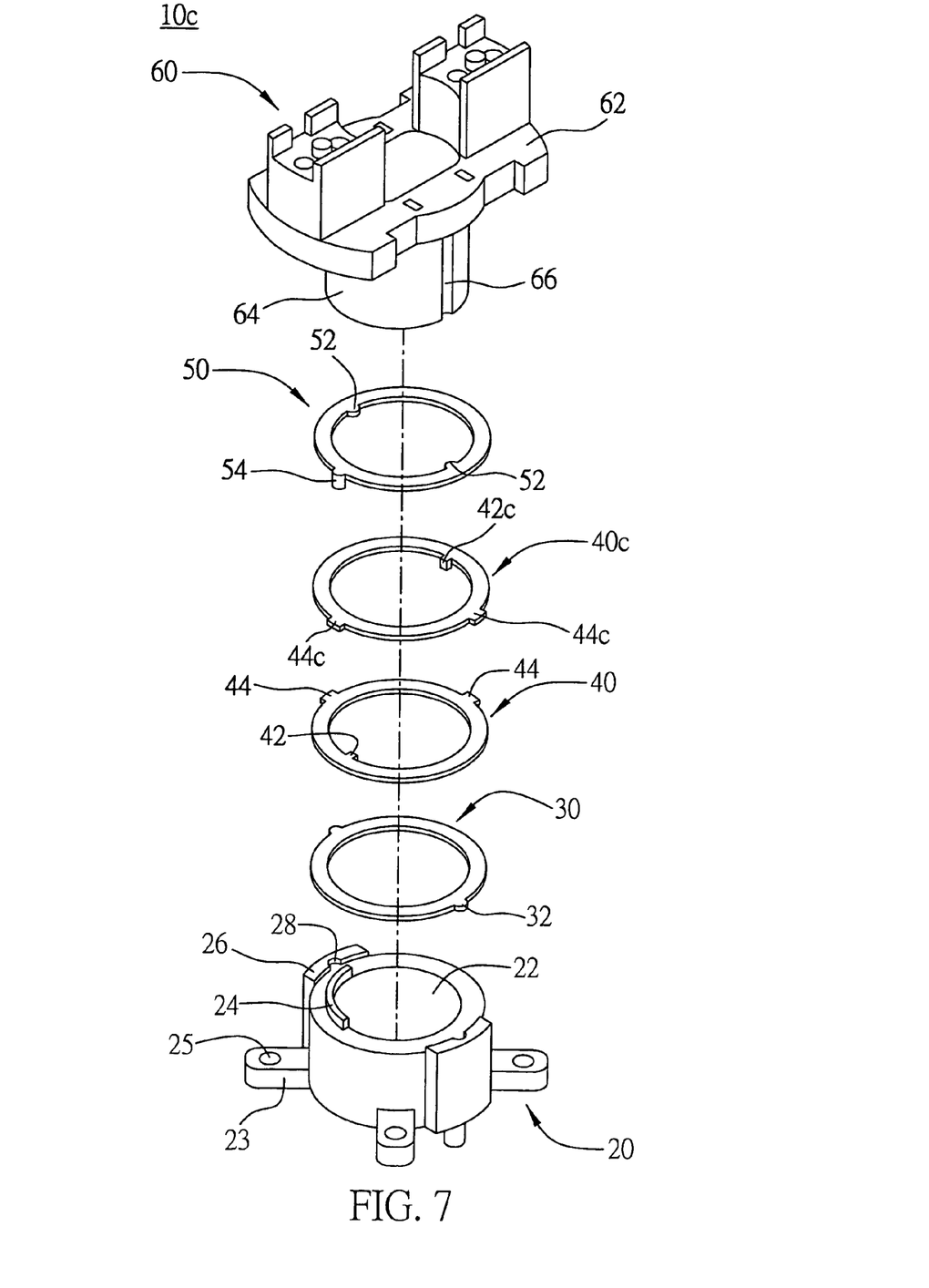
FIG. 7 is an exploded view of the rotational positioning apparatus in accordance with a fourth preferred embodiment of the present invention.

Referring to FIG. 7, a rotational positioning apparatus 10c of the present embodiment is similar to the rotational positioning apparatus 10 of the first preferred embodiment. The present embodiment differs from the first preferred embodiment in that an additional positioning washer is employed.

As illustrated in FIG. 7, a fourth washer 40c is disposed between the second washer 40 and the third washer 50. The fourth washer 40c that serves as a positioning washer is identical to the second washer 40 in structure and differs from the second washer 40 in terms of the assemble position. In the present embodiment, the forth washer 40c is disposed on the top end of the second washer 40. Two protruding portions 44c are formed and spaced apart at appropriate position on an outer circumferential surface of the fourth washer 40c. A positioning portion 42c is extended downward from appropriate position on an inner circumferential surface of the forth washer 40c. The top end and bottom end of each of the protruding portions 44c are flush with the top end and bottom end of the fourth washer 40c, respectively. The top end of the positioning portion 42c is flush with the top end of the fourth washer 40c, and the bottom end of the positioning portion 42c extends beyond the bottom end of the fourth washer 40c for an appropriate distance, wherein the appropriate distance may be the same as the thickness of the second washer 40. The positioning portion 42c of the fourth washer 40c is disposed between the two protruding portions 44 of the second washer 40. Thus, the positioning portion 42c is pre-rotated by a predetermined angle to abut against the any one of the protruding portions 44 of the second washer 40 to drive rotation of the second washer 40 when the fourth washer is rotated. The second ear protrusion 54 of the third washer 50 is disposed between the two protruding portions 44c of the forth washer 40c. So, the second ear protrusion 54 is pre-rotated by a predetermined angle to abut against any one of the protruding portions 44c of the fourth washer 40c to drive rotation of the fourth washer 40c when the third washer 50 is rotated.

It is understood from the above that the range of rotational angle for the rotational positioning apparatus 10c is expanded via the additional fourth washer 40c. In further embodiment, various numbers of the fourth washer 40c may be employed to enable rotation of the rotational positioning apparatus at any predetermined angle.

The assembly procedure and rotation movement of the rotational positioning apparatus 10c are approximately the same as those of the first preferred embodiment, so they are not further described herein.

It is to be understood that the fourth washer 40c of the rotational positioning apparatus 10c can also be employed in the rotational positioning apparatus according to the second preferred embodiment or the third preferred embodiment.

Fifth Preferred Embodiment

Figure 8:
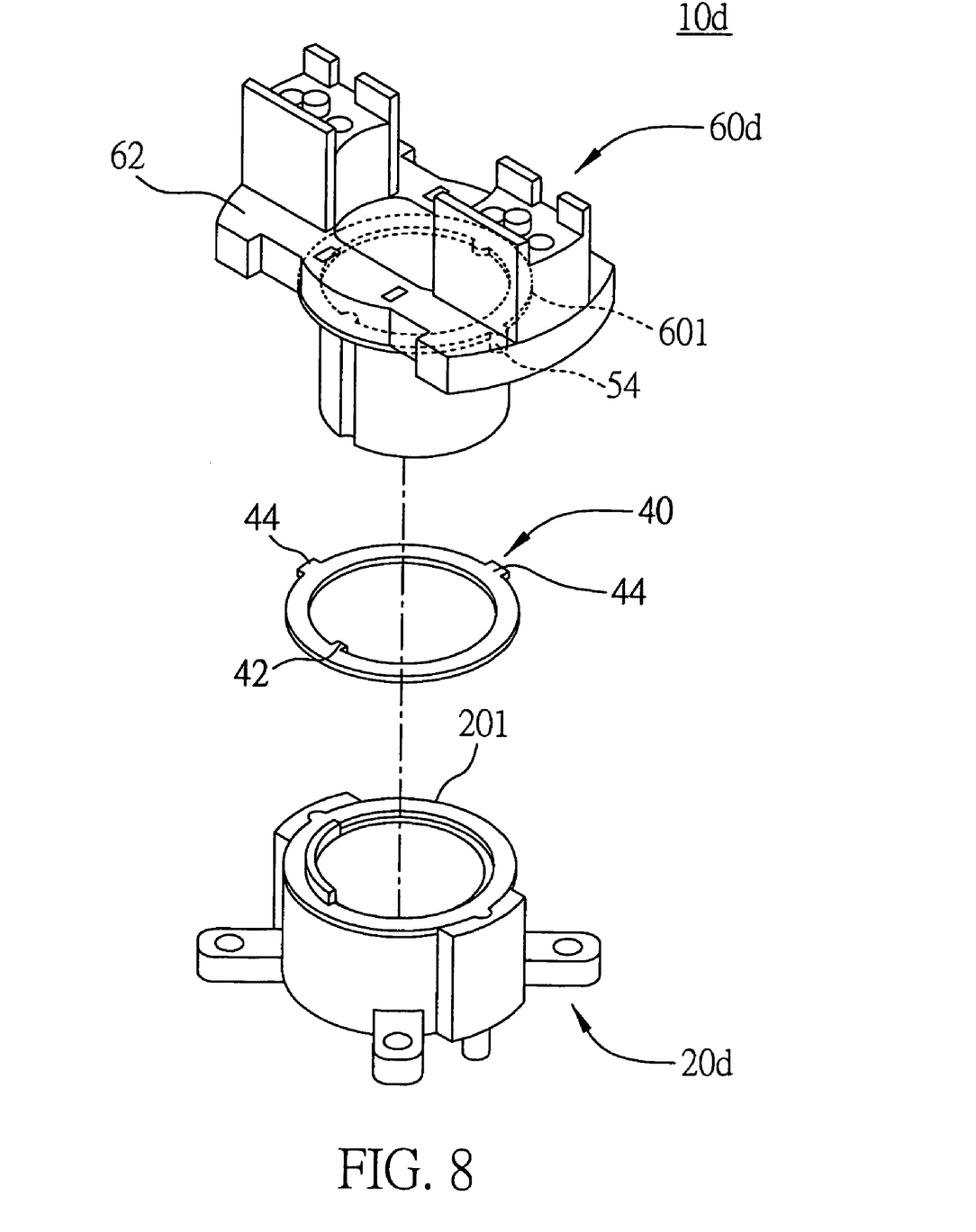
FIG. 8 is an exploded view of the rotational positioning apparatus in accordance with a fifth preferred embodiment of the present invention.

Referring to FIG. 8, a rotational positioning apparatus 10d of the present embodiment is similar to the rotational positioning apparatus 10 of the first preferred embodiment. The present embodiment differs from the first preferred embodiment in that a fixed member 20d having an integrally formed first wear member 201 to replace the first washer 30 of the first preferred embodiment. The second washer 40 that serves as a positioning member is disposed on the first wear member 201. And the rotating member 60d also has an integrally formed second wear member 601 to replace the third washer 50 of the first preferred embodiment.

To enhance the wear ability of the first wear member 201 and the second wear member 601, powder metallurgy method may be adopted to fabricate the fixed member 20d and the rotating member 60d. In the present embodiment, either the fixed member 20d and the first wear member 201 or the rotating member 60d and the second wear member 601 can be integrally formed with metal alloy powder, followed by sintering and hardening by ultrasonic thermal procedure, so as to enhance the wear ability and duration of the first wear member 201 and second wear member 601. It is to be understood that other methods for forming the fixed member 20d and the first wear member 201, and the rotating member 60d and the second wear member 601 known by those skilled in the art can also be employed in the present embodiment.

It should be apparent to those skilled in the art that the above description is only illustrative of specific embodiments and examples of the invention. For example, the arc-shaped stopper portion 24a of the first washer 30a of the second preferred embodiment may also be formed on the first wear member 201 of the fifth preferred embodiment; the post 54b of the base portion 62 of the fixed member 60b of the third preferred embodiment can also be formed on the first wear member 201 of the fifth preferred embodiment; the additional fourth washer 40c of the fourth preferred embodiment can also be employed in the first through to third, and fifth preferred embodiments. And the rotating member according to the second and fourth preferred embodiments may also be formed with the post 54b extending downward from one side of the base portion 62 in the fifth preferred embodiment. The invention should therefore cover various modifications and variations made to the herein-described structure and operations of the invention, provided they fall within the scope of the invention as defined in the following appended claims.

What is claimed is:

1. A rotational positioning apparatus, comprising:
a fixed member having a first wear portion and a stopper portion;
at least a positioning washer disposed on the first wear portion of the fixed member, wherein the positioning washer is formed with a positioning portion abutting against the stopper portion of the fixed member and at least a protruding portion extending radially outward; and
a rotating member having a second wear portion engaged with the positioning washer and a push portion for pushing the protruding portion of the positioning washer, so that the push portion drives rotation of the positioning washer and the positioning portion is stopped by the stopper portion to achieve positioning during the rotation,
wherein the second wear portion and the rotating member are individually formed and engaged with each other and the second wear portion is formed with a locking ear extending inward from an inner circumferential surface thereof, and the push portion is a second car protrusion extending outward from an outer circumferential surface of the second wear portion.

2. The rotational positioning apparatus as claimed in claim 1, wherein a pair of shoulder portions are formed to extend from opposite ends on an outer circumferential surface of the fixed member, with each of the shoulder portions being further defined with an ear concave portion, and the first wear portion comprises a pair of first ear protrusions extending outward to engage with the ear concave portions of the shoulder portions.

3. The rotational positioning apparatus as claimed in claim 1, wherein the first wear portion is integrally formed with the fixed member.

4. The rotational positioning apparatus as claimed in claim 1, wherein the first wear portion and the fixed member are individually formed and engaged with each other.

5. The rotational positioning apparatus as claimed in claim 4, wherein the first wear portion is a first washer.

6. The rotational positioning apparatus as claimed in claim 4, wherein the first wear portion comprises a pair of first ear protrusions extending outward to engage with the ear concave portions of the shoulder portions.

7. The rotational positioning apparatus as claimed in claim 1, wherein an inner circumferential surface of the first wear portion abuts with an outer circumferential surface of the stopper portion.

8. The rotational positioning apparatus as claimed in claim 1, wherein the stopper portion is an arc-shaped structure.

9. The rotational positioning apparatus as claimed in claim 1, wherein the stopper portion is a protruding structure.

10. The rotational positioning apparatus as claimed in claim 1, wherein the stopper portion is a concave structure.

11. The rotational positioning apparatus as claimed in claim 1, wherein the second wear portion is integrally formed with the rotating member.

12. The rotational positioning apparatus as claimed in claim 1, wherein an inner circumferential surface of the first wear portion abuts with an outer circumferential surface of the stopper portion.

13. The rotational positioning apparatus as claimed in claim 1, wherein the second wear portion is a third washer.

14. The rotational positioning apparatus as claimed in claim 1, wherein a top end of the push portion is flush with a top end of the second wear portion, and a bottom end of the push potion is extended beyond a bottom end of the second wear portion.

15. The rotational positioning apparatus as claimed in claim 1, wherein the push portion is a post extending downward from the second wear portion.

16. The rotational positioning apparatus as claimed in claim 1, wherein the inner circumferential surface of the second wear portion abuts with the outer circumferential surface of the stopper portion.

17. The rotational positioning apparatus as claimed in claim 1, wherein the rotating member further comprises a base portion and a receiving portion downwardly extending from the base portion.

18. The rotational positioning apparatus as claimed in claim 17, wherein the receiving portion is a hollow cylinder structure, and a locking slot is defined on an outer circumferential surface of a shaft portion.

19. The rotational positioning apparatus as claimed in claim 17, wherein the push portion is a post downwardly extending from the base portion.

20. A rotational positioning apparatus, comprising:
a fixed member having a first wear portion and a stopper portion;
at least a positioning washer disposed on the first wear portion of the fixed member, wherein the positioning washer is formed with a positioning portion abutting against the stopper portion of the fixed member and at least a protruding portion extending radially outward; and
a rotating member having a second wear portion engaged with the positioning washer and a push portion for pushing the protruding portion of the positioning washer, so that the push portion drives rotation of the positioning washer and the positioning portion is stopped by the stopper portion to achieve positioning during the rotation,
wherein the inner circumferential surface of the second wear portion abuts with the outer circumferential surface of the stopper portion.

21. The rotational positioning apparatus as claimed in claim 20, wherein a pair of shoulder portions are formed to extend from opposite ends on an outer circumferential surface of the fixed member, with each of the shoulder portions being further defined with an ear concave portion, and the first wear portion comprises a pair of first ear protrusions extending outward to engage with the ear concave portions of the shoulder portions.

22. The rotational positioning apparatus as claimed in claim 20, wherein the first wear portion is integrally formed with the fixed member.

23. The rotational positioning apparatus as claimed in claim 20, wherein the first wear portion and the fixed member are individually formed and engaged with each other.

24. The rotational positioning apparatus as claimed in claim 23, wherein the first wear portion is a first washer.

25. The rotational positioning apparatus as claimed in claim 23, wherein the first wear portion comprises a pair of first ear protrusions extending outward to engage with the ear concave portions of the shoulder portions.

26. The rotational positioning apparatus as claimed in claim 20, wherein the stopper portion is an arc-shaped structure.

27. The rotational positioning apparatus as claimed in claim 20, wherein the stopper portion is a protruding structure.

28. The rotational positioning apparatus as claimed in claim 20, wherein the stopper portion is a concave structure.

29. The rotational positioning apparatus as claimed in claim 20, wherein the second wear portion is integrally formed with the rotating member.

30. The rotational positioning apparatus as claimed in claim 20, wherein the second wear portion and the rotating member are individually formed and engaged with each other.

31. The rotational positioning apparatus as claimed in claim 30, wherein the second wear portion is a third washer.

32. The rotational positioning apparatus as claimed in claim 30, wherein a top end of the push portion is flush with a top end of the second wear portion, and a bottom end of the push potion is extending beyond a bottom end of the second wear portion.

33. The rotational positioning apparatus as claimed in claim 30, wherein the second wear portion is formed with a locking ear extending inward from an inner circumferential surface thereof, and the push portion is a second ear protrusion extending outward from an outer circumferential surface of the second wear portion.

34. The rotational positioning apparatus as claimed in claim 20, wherein the push portion is a post extending downward from the second wear portion.

35. The rotational positioning apparatus as claimed in claim 20, wherein the rotating member further comprises a base portion and a receiving portion downwardly extending from the base portion.

36. The rotational positioning apparatus as claimed in claim 35, wherein the receiving portion is a hollow cylinder structure, and a locking slot is defined on an outer surface of a shaft portion.

37. The rotational positioning apparatus as claimed in claim 35, wherein the push portion is a post downwardly extending from the base portion.

* * * * *